United States Patent
Xing et al.

(10) Patent No.: US 10,701,741 B2
(45) Date of Patent: Jun. 30, 2020

(54) METHOD FOR ESTABLISHING DIRECT CONNECTION LINK, AND METHOD AND NODE FOR REALIZING DATA TRANSMISSION THEREBY

(71) Applicant: ZTE CORPORATION, Shenzhen (CN)

(72) Inventors: Weimin Xing, Shenzhen (CN); Kaiying Lv, Shenzhen (CN); Zhiqiang Han, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 16/087,258

(22) PCT Filed: Dec. 16, 2016

(86) PCT No.: PCT/CN2016/110315
§ 371 (c)(1),
(2) Date: Sep. 21, 2018

(87) PCT Pub. No.: WO2017/161928
PCT Pub. Date: Sep. 28, 2017

(65) Prior Publication Data
US 2019/0075608 A1    Mar. 7, 2019

(30) Foreign Application Priority Data

Mar. 24, 2016  (CN) .............................. 2016 1 073404

(51) Int. Cl.
*H04W 76/10* (2018.01)
*H04L 5/00* (2006.01)
*H04W 76/14* (2018.01)
*H04W 76/11* (2018.01)
*H04W 72/04* (2009.01)
(Continued)

(52) U.S. Cl.
CPC ........... *H04W 76/10* (2018.02); *H04L 5/0037* (2013.01); *H04L 5/0094* (2013.01);
(Continued)

(58) Field of Classification Search
CPC . H04W 76/10; H04W 88/10; H04W 72/0406; H04W 76/11; H04W 76/14;
(Continued)

(56) References Cited

U.S. PATENT DOCUMENTS 8,208,451 B2   6/2012  Seok
8,855,092 B2   10/2014 Seok
(Continued)

FOREIGN PATENT DOCUMENTS

CN    101594578 A    12/2009
CN    103109552 A    5/2013
(Continued)

OTHER PUBLICATIONS

International Search Report in international application No. PCT/CN2016/110315, dated Feb. 21, 2017, 2 pgs.
(Continued)

*Primary Examiner* — Hashim S Bhatti
(74) *Attorney, Agent, or Firm* — Li & Cai Intellectual Property (USA) Office

(57) ABSTRACT

Disclosed are a method for establishing a direct connection link, and a method and a node for same realizing data transmission thereby. The establishment method comprises: establishing a direct connection link between a first node and a second node, determining a policy according to pre-set direct connection control information, and determining direct connection control information corresponding to the established direct connection link. The method disclosed herein realizes, by determining, for a direct connection link, specialized direct connection control information for identifying the direct connection link, optimization of the establishment and transmission process of the direct connection
(Continued)

link, such that the direct connection link well distinguishes from a link of a basic network architecture, thus improving the network efficiency.

19 Claims, 6 Drawing Sheets

(51) Int. Cl.
*H04W 88/10* (2009.01)
*H04W 16/14* (2009.01)
*H04W 84/12* (2009.01)
*H04W 36/00* (2009.01)

(52) U.S. Cl.
CPC ........ *H04W 72/0406* (2013.01); *H04W 76/11* (2018.02); *H04W 76/14* (2018.02); *H04W 88/10* (2013.01); *H04L 5/0055* (2013.01); *H04W 16/14* (2013.01); *H04W 36/03* (2018.08); *H04W 84/12* (2013.01)

(58) Field of Classification Search
CPC ..... H04W 36/03; H04W 84/12; H04W 16/14; H04L 5/0094; H04L 5/0037; H04L 5/0055

See application file for complete search history.

(56) References Cited

U.S. PATENT DOCUMENTS

| | | | |
|---|---|---|---|
| 8,982,812 B2 | 3/2015 | Abraham et al. | |
| 9,143,483 B2 * | 9/2015 | Wu | H04L 63/0407 |
| 2007/0242665 A1 * | 10/2007 | Habetha | H04W 76/11 |
| | | | 370/389 |
| 2009/0290563 A1 | 11/2009 | Gu | |
| 2012/0250576 A1 | 10/2012 | Rajamani | |
| 2016/0073408 A1 * | 3/2016 | Sartori | H04W 72/0453 |
| | | | 370/329 |
| 2016/0127424 A1 | 5/2016 | Lee et al. | |
| 2016/0174254 A1 * | 6/2016 | Hedayat | H04W 74/006 |
| | | | 370/329 |
| 2016/0192419 A1 | 6/2016 | Lee et al. | |
| 2017/0245225 A1 * | 8/2017 | Zhu | H04W 56/0025 |
| 2018/0084496 A1 | 3/2018 | Lee et al. | |

FOREIGN PATENT DOCUMENTS

| | | |
|---|---|---|
| CN | 103314629 A | 9/2013 |
| CN | 103733600 A | 4/2014 |
| CN | 104125610 A | 10/2014 |
| CN | 104254062 A | 12/2014 |
| CN | 104919723 A | 9/2015 |
| WO | 2014208878 A1 | 12/2014 |

OTHER PUBLICATIONS

English Translation of the Written Opinion of the International Search Authority in international application No. PCT/CN2016/110315, dated Feb. 21, 2017, 5 pgs.

"Proposed TGax Draft Specification", IEEE802.11, Wireless LANs, Mar. 2, 2016, CTPClassification=CTP_PUBLIC: VisualMarkings, section 25.11, 160 pgs.

* cited by examiner

| Conventional training field | Conventional signaling field | Conventional signaling field | Signaling field A | HE training field | Data payload |
|---|---|---|---|---|---|

FIG. 5

| Conventional training field | Conventional signaling field | Conventional signaling field | Signaling field A | Signaling field B | HE training field | Data payload sent to STA2 |
|---|---|---|---|---|---|---|
| | | | | | HE training field | Data payload sent to STA3 |

FIG. 6

| Conventional training field | Conventional signaling field | Conventional signaling field | Signaling field A | HE training field | Data payload sent form STA2 to STA1 |
|---|---|---|---|---|---|
| | | | | HE training field | Data payload sent form STA3 to STA1 |

METHOD FOR ESTABLISHING DIRECT CONNECTION LINK, AND METHOD AND NODE FOR REALIZING DATA TRANSMISSION THEREBY

TECHNICAL FIELD

The disclosure relates to and is not limited to the field of wireless local area network (WLAN), and in particular to a method for establishing a direct connection link, a method and a node for implementing data transmission.

BACKGROUND

A basic structure of a wireless local area network (WLAN) is a basic service set (BSS) including one access point station (AP STA) and multiple non-AP stations (non-AP STAs) associated with the AP. As illustrated in FIG. 1, FIG. 1 is a schematic diagram of a basic architecture of a WLAN in the related art. In the network structure illustrated in FIG. 1, data is aggregated and distributed in the AP. That is, communication generally only occurs between the non-AP STA and the AP. The relationship between the AP and the non-AP STA is similar to that of a base station and user equipment (UE) in a cellular network. The AP in FIG. 1 is a primary node, and the non-AP STAs can associate with the AP. An AP, a base station, a mesh network station and the like are collectively referred to as a primary node, and a non-AP STA, UE and the like are collectively referred to as a secondary node herein. Moreover, it is considered that the relationship between the primary node and the secondary node is not a peer-to-peer relationship, and the relationship between a primary node and another primary node or the relationship between the secondary nodes is a peer-to-peer relationship, that is, peer stations. In recent years, the communication requirement between the peer stations has been increasing, and there are corresponding technologies in various technical fields. For example, technologies are proposed in the WLAN, such as a tunnel direct connection link setup (TDLS) technology, a direct connection link setup (DLS) technology and the like for direct communication between non-AP STAs in the same BSS. In the cellular network, a device-to-device (D2D) technology that supports communication between UEs is proposed. In addition, communication may also be performed between the AP stations by using a technology such as the Mesh network.

At present, as more people use WLAN for data communication, a network load of the WLAN is also increasing. With the increase of the number of users or the interference between WLAN networks, the efficiency of the WLAN network also has a decreased trend significantly. Therefore, the IEEE Standards Organization has established a related task force to solve the problem of the decrease in the network efficiency of the WLAN. It has become a hot topic of discussion the technology of interference avoidance and efficiency improvement under the condition of dense network deployment. In the technology under discussion, a station supporting a new standard adds control information, such as a BSS network identifier (color bits), a station identifier (STA ID), an uplink/downlink flag (UL/DL flag), spatial multiplexing parameters and a reserved transmission duration to a physical-layer frame header of a transmitted radio frame in a new format. Accordingly, a station that detects the radio frame can determine basic conditions of a subsequent radio frame load or the transmission according to the control information in advance, thereby determining a next operation. The radio frames in the new format are collectively referred to as high efficiency (HE) radio frames. For example, a color value indicates a network identifier of the BSS, and the AP determines and notifies the color value to the stations associated to the AP. The radio frames from all the stations carry the color value. The station can determine whether the radio frame is under coverage of a BSS with which the station is associated according to the color value indicated in the detected radio frame, and determine, according to the uplink and downlink flags, whether the radio frame is transmitted via a downlink from the AP to the stations or via an uplink from the stations to the AP.

When the station determines that the radio frame is a frame from the BSS with which the station is associated according to the color value, and the station is not a receiver of the radio frame according to the uplink and downlink flags, for example, the radio frame is indicated as an uplink frame and is sent to the AP, a non-AP station in the BSS may not receive a subsequent data payload, and does not contend for a channel to avoid interference to the transmission being performed in the BSS. When the station determines, according to an indication of the color value, that the radio frame is not a frame from the BSS with which the station is associated, the station may choose to perform spatial multiplexing according to information such as energy of the radio frame and interference level, thereby increasing transmission opportunities. In summary, wireless resources may be more efficiently utilized between BBSs by using information such as the network identity of the BSS, the uplink and downlink flags.

The problem of interference to data transmission in an infrastructure BSS can be solved effectively by using the above-described technology for carrying control information in the physical-layer frame header of the HE radio frame. However, in a solution of efficiency improvement in consideration of a transmission between the AP and the non-AP STA in the related art, neither the effect on the transmission of the infrastructure BSS by the direct connection link and transmission process between peer stations nor the interaction effect between multiple direct connection links is considered.

SUMMARY

The following is an overview of the subject matter described in detail herein. The summary is not intended to limit the protection scope of the claims.

The embodiments of the present disclosure provide a method for establishing a direct connection link and a method and a node for implementing data transmission, thereby optimizing the establishment and a transmission process of the direct connection link and improving network efficiency.

The embodiments of the present disclosure provide a method for establishing a direct connection link, which includes the following operations.

A direct connection link is established between a first node and a second node; and direct connection control information for the established direct connection link is determined according to a preset strategy for determining direct connection control information.

The strategy for determining direct connection control information may include determining the direct connection control information by negotiation between the first node and the second node, and the establishing method may include the following operations.

The first node sends a direct connection link request frame to the second node, where the direct connection link request frame carries at least one direct connection control information available to the first node;

the first node receives a direct connection link response frame from the second node, where the direct connection link response frame carries at least one direct connection control information available to the second node; and the first node sends a direct connection link acknowledgement frame to the second node, where the direct connection link acknowledgement frame carries the determined direct connection control information for the direct connection link.

The establishing method may further include the following operation. The first node determines the direct connection control information for the established direct connection link according to the at least one direct connection control information available to the first node and the at least one direct connection control information available to the second node.

The first node and the second node may be secondary nodes; and the direct connection link request frame, the direct connection link response frame and the direct connection link acknowledgement frame may be forwarded by a primary node with which the first node and the second node are associated.

The first node and the second node may be secondary nodes; and the establishing method may further include the following operation.

The first node sends a notification frame to a primary node with which the first node is associated, where the notification frame includes at least one of the following information: an establishment complete indication of the direct connection link, a direct connection identifier of an established direct connection link, characteristics of a service transmitted over the direct connection link, or a channel access manner of the direct connection link.

The establishing method may further include the following operation.

Upon reception of the notification frame by the primary node, the first node receives a notification acknowledgement frame from the primary node, where the notification acknowledgement frame includes at least one of the following information: a direct connection identifier allocated to the direct connection link, a specified channel access manner of the direct connection link, or specified channel access parameters of the direct connection link.

The strategy for determining the direct connection control information may include determining preset direct connection control information for the direct connection link to be the direct connection control information for the established direct connection link; and the establishing method may include the following operation. A direct connection link is established between the first node and the second node, and the preset direct connection control information for the direct connection link is determined to be the direct connection control information for the established direct connection link.

The first node and the second node may be secondary nodes; the strategy for determining the direct connection control information may include determining direct connection control information provided by a primary node with which the first node and the second node are associated to be the direct connection control information for the established direct connection link; and the establishing method may include the following operations.

A direct connection link is established between the first node and the second node; and the first node and the second node determine one of multiple direct connection identifiers broadcasted by the primary node to be a direct connection identifier in the direct connection control information; or, the first node and the second node determine a direct connection identifier allocated by the primary node to be a direct connection identifier in the direct connection control information; or, the first node and the second node determine a direct connection identifier which is notified by the primary node and determined according to a network identifier of an infrastructure network or a device identifier of the primary node to be a direct connection identifier in the direct connection control information; or, the first node and the second node determine a preset reserved value to be a direct connection identifier in the direct connection control information when neither the first node nor the second node receives a notification from the primary node with which the first node and the second node are associated.

The direct connection control information may include at least one of: a direct connection identifier of the direct connection link or a transmission direction value of the direct connection link.

The direct connection identifier may be a network identifier for the direct connection link.

When the first node and the second node are primary nodes, the transmission direction value of the direct connection link indicates uplink; or when the first node and the second node are secondary nodes, the transmission direction value of the direct connection link indicates downlink.

The establishing method may further include the following operations. Before determining the direct connection identifier in the direct connection control information, the first node or the second node or a primary node checks radio frames transmitted on a wireless channel; and the first node or the second node or the primary node determines network identifiers of an infrastructure network that have been taken for other networks or other basic service sets (BSSs) and network identifiers that have been taken for other direct connection links.

The establishing method may further include the following operation. After the direct connection link is established, the first node or the second node modifies the direct connection identifier for the direct connection link according to a network condition.

The establishing method may further include the following operation. The first node or the second node receives notification information carrying measures for controlling activities of stations of the direct connection link from a primary node.

The notification information may include at least one of the following information: an indication of whether to allow peer stations to select a direct connection identifier freely, an indication of whether to require the peer stations to notify the primary node of establishment of the direct connection link, or information of resource usage limits of the direct connection link.

The first node and the second node may be peer stations.

The establishing method may further include the following operation. The peer stations transmit radio frames via an established direct connection link, where the radio frames carry the direct connection control information.

The peer stations may be secondary nodes or primary nodes.

Carrying the direct connection control information in the radio frame may include the following operation.

The direct connection control information is indicated in a first signaling field of a header of a radio frame, when one of the peer stations sends the radio frame in a single user format; or the direct connection control information is indicated in a first signaling field of a header of a radio frame, an identifier of at least one target peer station receiving the radio frame is indicated in a second signaling field of a header of the radio frame, when one of the peer stations sends the radio frame in a multi user format; or the direct connection control information is indicated in a first signaling field of a header of a radio frame in a trigger format, when one of the peer stations sends a trigger frame to multiple other peer stations establishing direct connection links to notify the peer stations to send data to the peer station initiating the trigger frame and the radio frame in a trigger format is returned by at least one of the multiple other peer stations receiving the trigger frame.

The radio frame or the radio frame in the trigger format may be a radio frame in a high efficiency (HE) format.

The embodiments of the present disclosure further provide a method for implementing data transmission on a direct connection link, which includes the following operation. Peer stations transmit radio frames via an established direct connection link, where the radio frame carries direct connection control information.

The peer stations may be secondary nodes or primary nodes.

Carrying the direct connection control information in the radio frame may include the following operation.

The direct connection control information is indicated in a first signaling field of a header of a radio frame, when one of the peer stations sends the radio frame in a single user format; or the direct connection control information is indicated in a first signaling field of a header of a radio frame, and an identifier of at least one target peer station receiving the radio frame is indicated in a second signaling field of the header of the radio frame, when one of the peer stations sends the radio frame in a multi user format; or the direct connection control information is indicated in a first signaling field of a header of a radio frame in a trigger format, when one of the peer stations sends a trigger frame to multiple other peer stations establishing direct connection links to notify the peer stations to send data to the peer station initiating the trigger frame and the radio frame in a trigger format is returned by at least one of the multiple other peer stations receiving the trigger frame.

The radio frame or the radio frame in the trigger format may be a radio frame in a high efficiency (HE) format.

The direct connection control information may include at least one of: a direct connection identifier of the direct connection link, or a transmission direction value of the direct connection link.

The direct connection identifier may be a network identifier for the direct connection link.

When the peer stations are primary nodes, the transmission direction value of the direct connection link may indicate uplink; or when the peer stations are secondary nodes, the transmission direction value of the direct connection link may indicate downlink.

The embodiments of the present disclosure further provide a node, which at least includes an establishing module and a determining module.

The establishing module is configured to establish a direct connection link between the node and a peer node of the node; and the determining module is configured to determine direct connection control information for the established direct connection link according to a preset strategy for determining direct connection control information.

The node may further include a transmitting module configured to transmit a radio frame via the established direct connection link, where the radio frame carries the direct connection control information.

The determining module may be configured to notify the establishing module when the strategy for determining the direct connection control information includes determining the direct connection control information by negotiation between peer stations; and the establishing module may be configured to negotiate the direct connection control information in a process of establishing the direct connection link between the node and the peer node of the node.

The establishing module may be configured to:

send a direct connection link request frame to the peer node of the node, where the direct connection link request frame carries at least one direct connection control information available to the node;

receive a direct connection link response frame from the peer node of the node, where the direct connection link response frame carries at least one direct connection control information available to the peer node of the node; and send a direct connection link acknowledgement frame to the peer node of the node, where the direct connection link acknowledgement frame carries the determined direct connection control information for the direct connection link.

The direct connection link request frame, the direct connection link response frame and the direct connection link acknowledgement frame may be forwarded by a primary node with which the node is associated when the node and the peer node of the node are secondary nodes.

The transmitting module may further be configured to send a notification frame to a primary node with which the node is associated, where the notification frame includes at least one the following information: an establishment complete indication of the direct connection link, a direct connection identifier of the established direct connection link, characteristics of a service transmitted over the direct connection link or a channel access manner of the direct connection link.

The transmitting module may further be configured to: receive a notification acknowledgement frame from the primary node with which the node is associated, where the notification acknowledgement frame includes at least one of the following information: a direct connection identifier allocated to the direct connection link, a specified channel access manner of the direct connection link, or specified channel access parameters of the direct connection link.

The determining module may further be configured to modify the direct connection identifier for an established direct connection link according to a network condition after the direct connection link is established.

When the strategy for determining the direct connection control information comprises determining preset direct connection control information for the direct connection link to be direct connection control information for the established direct connection link, the determining module may be configured to: determine the preset direct connection control information for the direct connection link to be the direct connection control information for the established direct connection link.

When the node and the peer node of the node are secondary nodes and the strategy for determining the direct connection control information includes determining direct connection control information provided by a primary node to be the direct connection control information for the established direct connection link, the determining module may be configured to:

determine direct connection control information from the primary node with which the node is associated to be the direct connection control information for an established direct connection link.

The direct connection control information from the primary node with which the node is associated may include: a direct connection identifier broadcasted by the primary node, a direct connection identifier allocated by the primary node, or a direct connection identifier in the direct connection control information determined by the primary node according to a network identifier of an infrastructure network or a device identifier of the primary node.

The determining module may further be configured to: check radio frames transmitted on a wireless channel; and determine network identifiers of an infrastructure network that have been taken for other networks or other BSSs and network identifiers that have been taken for other direct connection links.

The determining module may further be configured to:

receive notification information carrying measures for controlling an activity of a station of the direct connection link from the primary node with which the node is associated.

The notification information may include at least one of the following information: an indication of whether to allow peer stations to select a direct connection identifier freely, an indication of whether to require the peer stations to notify the primary node of establishment of the direct connection link, or information of resource usage limits of the direct connection link.

The transmitting module may further be configured to:

indicate, in a first signaling field of a header of a radio frame, the direct connection control information, when the node where the transmitting module is located sends the radio frame in a single user format;

indicate, in a first signaling field of a header of the radio frame, the direct connection control information, and indicate, in a second signaling field of the header of the radio frame, an identifier of at least one target peer station receiving the radio frame, when the node where the transmitting module is located sends the radio frame in a multi user format; or indicate, in a first signaling filed of a header of a radio frame in a trigger format, the direct connection control information, when the node where the transmitting module is located sends the trigger frame to multiple other peer stations establishing direct connection links to notify the peer stations to send data to the peer station initiating the trigger frame and the radio frame in a trigger format is returned by at least one of the multiple other peer stations receiving the trigger frame.

The radio frame or the radio frame in the trigger format may be a radio frame in a high efficiency (HE) format.

The embodiments of the present disclosure provide a node, which at least includes a transmitting module configured to transmit a radio frame via an established direct connection link, where the radio frame carries direct connection control information.

The node may be a secondary node or a primary node.

The transmitting module may be configured to:

indicate, in a first signaling field of a header of a radio frame, the direct connection control information, when the node where the transmitting module is located sends the radio frame in a single user format;

indicate, in a first signaling field of a header of a radio frame, the direct connection control information, and indicate, in a second signaling field of the header of the radio frame, an identifier of at least one target peer station receiving the radio frame, when the node where the transmitting module is located sends the radio frame in a multi user format; or indicate, in a first signaling field of a header of a radio frame in a trigger format, the direct connection control information, when the node where the transmitting module is located sends the trigger frame to multiple other peer stations establishing direct connection links to notify the peer stations to send data to the peer station initiating the trigger frame and the radio frame in a trigger format is returned by at least one of the multiple other peer stations receiving the trigger frame.

The radio frame or the radio frame in the trigger format may be a radio frame in an HE format.

The direct connection control information may include at least one of: a direct identifier of the direct connection link or a transmission direction value of the direct connection link.

The direct connection identifier may be a network identifier for the direct connection link.

When the node is a primary node, the transmission direction value of the direct connection link may indicate uplink; or when the node is a secondary node, the transmission direction value of the direct connection link may indicate downlink.

The embodiments of the disclosure further provide a computer-readable storage medium storing computer-executable instructions to implement the above-described method for establishing the direct connection link when being executed by a processor.

The embodiments of the disclosure further provide a computer-readable storage medium storing computer executable instructions to implement the above-described method for implementing data transmission on the direct connection link when being executed by a processor.

The method for establishing a direct connection link according to the present disclosure includes: establishing a direct connection link between the first node and the second node, and determining direct connection control information for an established direct connection link according to a preset strategy for determining direct connection control information. With the method according to the present disclosure, direct connection control information for identifying the direct connection link is determined for the direct connection link, thereby optimizing processes of an establishment and transmission of the direct connection link, so that the direct connection link is well distinguished from a link of an infrastructure network, and increasing network efficiency.

In an exemplary implementation, the strategy for determining the direct connection control information determination may include but is not limited to: determining the direct connection control information by negotiation between the first node and the second node; or, determining the preset direct connection control information for the direct connection link to be the direct connection control information for the established direct connection link; or, determining direct connection control information provided by a primary node to be the direct connection control information for the established direct connection link when the first node and the second node are secondary nodes, for example, a direct connection identifier broadcasted by the primary node, a direct connection identifier allocated by the primary node, or a direct connection identifier determined by the primary node based on a network identifier of an infrastructure network, and the like.

Other features and advantages of the present disclosure will be set forth in the following description and become apparent from the description, or are understood by implementing the present disclosure. The objectives and other advantages of the present disclosure may be realized and obtained by the structure noted in the description, the claims and the drawings.

BRIEF DESCRIPTION OF DRAWINGS

The drawings described herein are intended to provide a further understanding the present disclosure, and constitute a part of the present disclosure. The exemplary embodiments of the present disclosure and descriptions thereof are intended to explain the present disclosure and do not mean to improperly limit the present disclosure. In the drawings:

FIG. 5 is a schematic diagram of an HE radio frame format in a single user format radio frame according to an embodiment of the present disclosure;

FIG. 6 is a schematic diagram of an HE radio frame format in a multi user format radio frame according to an embodiment of the present disclosure;

DETAILED DESCRIPTION

The embodiments of the present disclosure will be described in detail below with reference to the drawings. It should be noted that, the embodiments in the present disclosure and the features in the embodiments may be arbitrarily combined with each other without conflict.

The method for establishing a direct connection link according to the present disclosure includes that: a direct connection link between the first node and the second node is established, and direct connection control information for the direct connection link is determined according to a preset strategy for determining direct connection control information.

The strategy for determining the direct connection control information may include but is not limited to: determining the direct connection control information by negotiation between the first node and the second node; or, determining the preset direct connection control information for the direct connection link to be the direct connection control information for the established direct connection link; or, determining direct connection control information provided by a primary node to be the direct connection control information for the established direct connection link when the first node and the second node are secondary nodes, for example, a direct connection identifier broadcasted by the primary node, a direct connection identifier allocated by the primary node, or a direct connection identifier determined by the primary node based on a network identifier of an infrastructure network, and the like.

With the method according to the present disclosure, direct connection control information dedicated to identify the direct connection link is determined for the direct connection link, thereby optimizing processes of an establishment and transmission of the direct connection link, so that the direct connection link is well distinguished from a link of an infrastructure network, and a network efficiency is increased.

Figure 1:
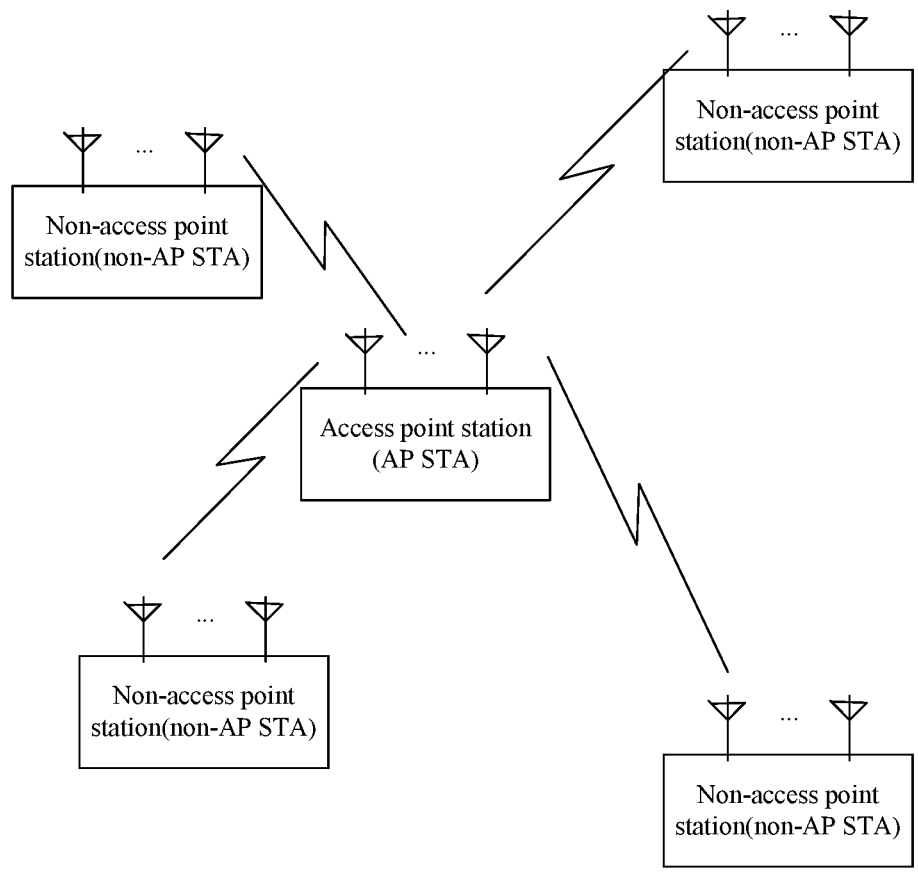
FIG. 1 is a schematic diagram of a basic architecture of a WLAN in the related art.
Figure 2:
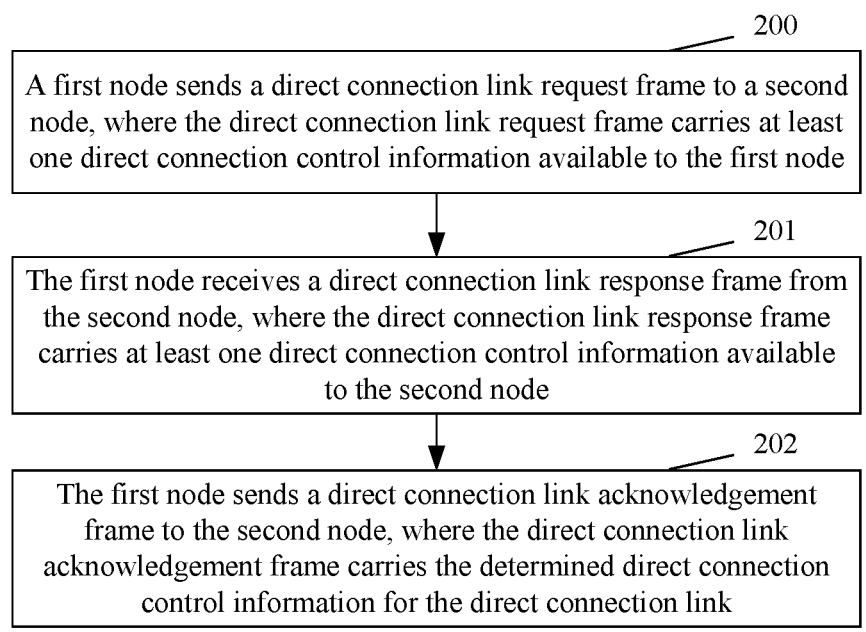
FIG. 2 is a flowchart of a method for establishing a direct connection link according to an embodiment of the present disclosure.

FIG. 2 is a flowchart of a method for establishing a direct connection link according to an embodiment of the present disclosure. As illustrated in FIG. 2, when the strategy for determining the direct connection control information includes determining by negotiation between a first node and a second node, the method for establishing a direct connection link according to the present embodiment includes the following operations.

At block 200, the first node sends a direct connection link request frame to the second node, the direct connection link request frame indicates at least one direct connection control information available to the first node.

The first node and the second node are peer stations, and are under coverage of a same network or a same BSS.

The direct connection control information includes at least of: a direct connection identifier of a direct connection link or a transmission direction value of a direct connection link. The direct connection identifier is a network identifier for the direct connection link, such as a color value.

When the above-described peer stations (that are the first node and the second node) are primary nodes, the transmission direction value of the direct connection link may indicate uplink; or when the first node and the second node are secondary nodes, the transmission direction value of the direct connection link may indicate downlink.

At block 201, the first node receives a direct connection link response frame from the second node, where the direct connection link response frame indicates at least one direct connection control information available to the second node.

At block 202, the first node sends a direct connection link acknowledgement frame to the second node, where the direct connection link acknowledgement frame indicates the determined direct connection control information for the direct connection link.

The first node determines the direct connection control information for the established direct connection link between the first node and the second node according to the at least one direct connection control information available to the first node and the at least one direct connection control information available to the second node.

The direct connection control information for the direct connection link between the first node and the second node may be determined according to the following strategy.

Any one of elements of an intersection of a set of the direct connection control information available to the first node and a set of the direct connection control information available to the second node is determined to be the determined direct connection control information. In case that there is no intersection between the both, the first node determines any one of elements of the set of the direct connection control information available to the first node or the set of the direct connection control information available to the second node to be the determined direct connection control information.

Or, when the set of the direct connection control information available to the second node returned by the second node is a subset of the set of the direct connection control information available to the first node sent by the first node, the first node determines one of elements of the set of the direct connection control information returned by the second node to be the determined direct connection control information.

It should be noted that, when the first node and the second node are secondary nodes, the direct connection link request frame, the direct connection link response frame and the direct connection link acknowledgement frame may be forwarded by a primary node with which the first node and the second node are associated.

In an exemplary implementation, when the first node and the second node are secondary nodes, the method for establishing a direct connection link as illustrated in FIG. 2 may further include the following operation.

The first node sends a notification frame to a primary node with which the first node is associated, where the notification frame includes at least one of the following information: an establishment complete indication of the direct connection link, a direct connection identifier of an established direct connection link, characteristics of a service transmitted over the direct connection link, or a channel access manner of the direct connection link.

Characteristics of a service transmitted over the direct connection link may include a transmission rate of the direct connection link, a service specification, resources to be occupied by the service. The channel access manner of the direct connection link may indicate a manner in which the first node and the second node occupy resources, such as a channel access manner based on contention, or a channel access manner based on scheduling (that is a manner of allocating resources by the primary node), or a combination of the two manners.

In this case, the primary node learns a condition of direct connection links established between the secondary nodes associated with the primary node by receiving a notification frame.

In an exemplary implementation, the primary node may further send a notification acknowledgement frame to the first node upon reception of the notification frame from the first node. The notification acknowledgement frame includes at least one of the following information: a direct connection identifier allocated to the direct connection link, or a specified channel access manner of the direct connection link or specified channel access parameters of the direct connection link. Accordingly, the primary node controls communication between stations of the direct connection link, thereby avoiding interference between a transmission of an infrastructure network and a transmission of the direct connection link.

It should be noted that, the direct connection identifier allocated to the direct connection link in the notification acknowledgment frame may be different from the direct connection identifier of the established direct connection link carried in the notification frame, for example, a station reports an identifier of A, and an AP may indicate B.

The specified channel access manner of the direct connection link in the notification acknowledgment frame may be at least one of a contention manner or a scheduling manner. For example, it is assumed that an access manner indicated to the AP by a secondary node is free contention for channel. However, the AP may indicate a scheduling access manner to the secondary node, that is, a manner of allocating resources to the direct connection link by the AP, and it is not allowed that the stations access by free contention. Since the primary node understands a load of an entire network, it is reasonable to cause the primary node to determine a final access manner. For example, the secondary nodes may be prevented from competing for resources when the network has a heavy load; or the secondary nodes may be allowed to contend for resources freely when the network has a light load.

In an exemplary implementation, after the direct connection link is established, peer stations may also modify a direct connection identifier (such as a color value) corresponding to the direct connection link according to a condition of the network (such as a load). The modifying process is similar to the establishing process, which is not described here.

In the establishment of the direct connection link as illustrated FIG. 2, direct connection control information for the direct connection link is determined by negotiation. In addition, the direct connection control information for the direct connection link may also be determined in the following manner.

In one manner, a strategy for determining the direct connection control information is: determining preset direct connection control information for a direct connection link to be the direct connection control information for an established direct connection link. Specifically, the direct connection control information for the direct connection link is preset. Accordingly, the preset direct connection control information is determined to be the direct connection control information of the established direct connection link as long as a direct connection link between the first node and the second node is established. That is, in this manner, different transmissions (that is a transmission via a direct connection link and a transmission via an infrastructure network) are distinguished according to the specially-set direct connection control information of the direct connection link.

The first node and the second node are peer stations, and may be under coverage of a same network or a same BSS.

The direct connection control information includes at least of: a direct connection identifier of a direct connection link or a transmission direction value of a direct connection link. The direct connection identifier is a network identifier for the direct connection link, such as a color value.

When the peer stations are primary nodes, the transmission direction value of the direct connection link may indicate uplink; or when the peer stations are secondary nodes, the transmission direction value of the direct connection link may indicate downlink.

In another manner, when the peer stations are secondary nodes, the strategy for determining direct connection control information is determining direct connection control information provided by a primary node to be the direct connection control information for the established direct connection link. After the direct connection link between the first node and the second node is established, the direct connection control information for the direct connection link may be determined by using the following method.

The primary node broadcasts a direct connection identifier. Specifically, the primary node notifies at least one direct connection identifier specially allocated to the direct connection link, such as a network identifier (i.e., a color value). In this case, when all the secondary nodes under a BSS of the primary node establish direct connection links, the direct connection identifier of one of the direct connection links is one of the at least one network identifier broadcasted by the primary node. A direct connection identifier broadcasted by the primary node may be selected randomly here. Alternatively, a direct connection identifier that occurs less is determined to be an identifier of the direct connection link through a radio frame for sounding channel by the secondary node. The direct connection identifier is a direct connection identifier without a conflict or with little conflict. Further, the primary node may also update the network identifier allocated to the direct connection link according to the condition of the network such as a load.

Alternatively, the primary node may allocate a direct connection identifier to currently-established direct connection link (it is equivalent to a unicast configuration, that is, a direct connection identifier is configured for a direct connection link individually). Specifically, the primary node allocates a direct connection identifier to the currently-established direct connection link and notifies the direct connection identifier to the first node and the second node establishing the direct connection link, when learning that there is an established direct connection link (for example, upon reception of a notification sent by the first node of the currently-established direct connection link).

Alternatively, the primary node may determine the direct connection identifier according to a network identifier of an infrastructure network or a device identifier of the primary node, and notifies to the first node and the second node related to the currently-established direct connection link. Specifically, determining the direct connection identifier according to the network identifier of the infrastructure network or the device identifier of the primary node includes the following operation. Determining the network identifier of the infrastructure network to be the direct connection identifier of a direct connection link established under the BSS; or determining a value obtained by adding the network identifier of the infrastructure network to a preset specified value to be the direct connection identifier of the direct connection link; or determining a value obtained by performing operation on the network identifier of the infrastructure network to be the direct connection identifier, the operation may be a common operation such as subtraction, exclusive OR, modulo, or any combination of the operations. It should be noted that, when the network identifier of the infrastructure network is not acquired from the primary node in the network or BSS where the secondary node is located by the secondary node establishing the direct connection link (for example, the primary node is a traditional station without a capability of notifying the network identifier of the infrastructure network to the secondary node, that is, the infrastructure network has no network identifier, and the like), that is, a notification from the primary node with which the first node and the second node are associated is not received, the direct connection identifier may be a preset reserved value.

It should be noted that, when all the network identifiers are occupied by other direct connection links or other networks, it is indicated that a network deployment is dense. In this case, when there is no appropriate direct connection identifier, peer stations may use the network identifier of the infrastructure network.

In the above-described method for determining the direct connection control information for the direct connection link according to the embodiments of the disclosure, in addition to the manner of using the preset direct connection control information for the direct connection link, in one aspect, the establishing method in the present embodiment may further include the following operations. Before a peer station determines a direct connection identifier, the peer station (that is the first node or the second node) or the primary node checks radio frames transmitted on a wireless channel (that is, checking control information or a network identifier carried in the radio frames transmitted on the wireless channel, for example, checking a first signaling field in a physical-layer frame header in the radio frame to determine which network identifiers that have been taken for other networks or other links) to determine network identifiers of an infrastructure network that have been used for other surrounding networks or other surrounding BSSs, and the network identifiers that have been occupied by other surrounding direct connection links. In this case, when the first node and the second node negotiate the direct connection control information subsequently or the primary node broadcasts or allocates direct connection control information, a value different from the occupied network identifiers may be determined to be a network identifier of the currently-established direct connection link.

On the other hand, after the direct connection link is established, the establishing method further includes that the peer stations may also modify the network identifier for the direct connection link based on changes of the surrounding network environment. Specifically, radio frames of other stations may be detected via the air interface to determine the conflict condition of the network identifier or the direct connection identifier. When the conflict is serious (for example, a radio frame carrying a direct connection identifier being the same as that of the direct link where the peer station is located is received), other direct connection identifiers may be used to avoid the conflict. The process of modifying the direct connection identifier is similar to the process of determining the direct connection identifier. For example, it is assumed that, when the first node determines that there is a conflict, the first node sends a handover direct connection identifier request frame carrying the modified direct connection identifier to the second node. Then the second node sends a handover response frame to the first node, and the first node finally sends an acknowledgement frame to complete the process of modifying the direct connection identifier.

In addition, when the peer stations are secondary nodes, in order to improve network efficiency and reduce the interference caused by resources contention on the direct connection link, the primary node may further take some measures to control activities of stations of the direct connection link. For example, the primary node with which the peer stations is associated sends notification information to the peer stations, and the notification information may include at least one of the following information: an indication of whether to allow peer stations to select a direct connection identifier freely, an indication of whether to require the peer stations to notify the primary node of establishment of the direct connection link, or information of resource usage limits of the direct connection link.

When the notification information includes the indication of whether to allow peer stations to select a direct connection identifier freely, it is limited that direct connection links of the peer stations use a color value freely. For example, when the peer stations are not allowed to freely select a direct connection identifier, the color value selected when establishing the direct connection link can only be a color value corresponding to an infrastructure network or a preset reserved value. When the peer stations are allowed to freely select a direct connection identifier, the peer stations may determine the color value of the direct connection link by negotiation using the method illustrated in FIG. 2.

When the notification information includes an indication of whether to require the peer stations to notify the primary node of establishment of the direct connection link and the peer stations are required to notify the primary node of the establishment of the direct connection link, the peer stations need to report the information (such as an establishment complete indication of the direct connection link, a direct connection identifier of an established direct connection link, characteristics of a service transmitted over the direct connection link, or a channel access manner of the direct connection link) related to the establishment of the direct connection link to the primary node, after the direct connection link is established between the peer stations and the direct connection control information is determined.

The notification information may include the information of resource usage limits of the direct connection link. For example, the transmission resource of the direct connection link may be limited to be the resource indicated by the primary node, and resource access parameters or a channel access mode indicated by the primary node is used to obtain a transmission opportunity and the like.

The embodiments of the disclosure further provide a method for implementing data transmission on a direct connection link, which includes that the peer stations transmit radio frames via an established direct connection link, where the radio frames carry the direct connection control information.

It should be noted that, the method for implementing data transmission on a direct connection link according to the embodiments of the disclosure may be based on the method for establishing a direct connection link according to the embodiments of the disclosure, or how to establish the direct connection link may also not be limited, as long as the direct connection link is established and direct connection control information of the established direct connection link is determined.

The direct connection control information includes at least of: a direct connection identifier of a direct connection link or a transmission direction value of a direct connection link. The direct connection identifier is a network identifier for the direct connection link, such as a color value.

When the peer stations are primary nodes, the transmission direction value of the direct connection link may indicate uplink; or when the first node and the second node are secondary nodes, the transmission direction value of the direct connection link may indicate downlink.

Carrying the direct connection control information in the radio frame includes the following operation.

The direct connection control information is indicated in a first signaling field of a header of the radio frame, when one of the peer stations sends the radio frame in a single user format. In some embodiments, to improve the reliability of the first signaling field, two or more first signaling fields may be provided, that is, the first signaling field is repeated.

The direct connection control information is indicated in a first signaling field of a header of the radio frame, an identifier of at least one target peer station receiving the radio frame is indicated in a second signaling field of a header of the radio frame, when one of the peer stations sends radio frames in a multi user format.

The direct connection control information is indicated in a first signaling field of a header of a radio frame in a trigger format, when one of the peer stations sends the trigger frame to multiple other peer stations establishing the direct connection link to notify the peer stations to send data to the peer station initiating the trigger frame and a radio frame in a trigger format is returned by at least one of the multiple other peer stations receiving the trigger frame.

The above-described radio frame or the radio frame in the trigger format is a radio frame in an HE format, and may also include a conventional training field and a conventional signaling field for backward compatibility with the conventional WLAN device, and the conventional signaling field is repeated to determine that the radio frame is in the HE frame format.

The technical solution according to the embodiments of the present disclosure is described in detail below with reference to specific embodiments.

Figure 3:
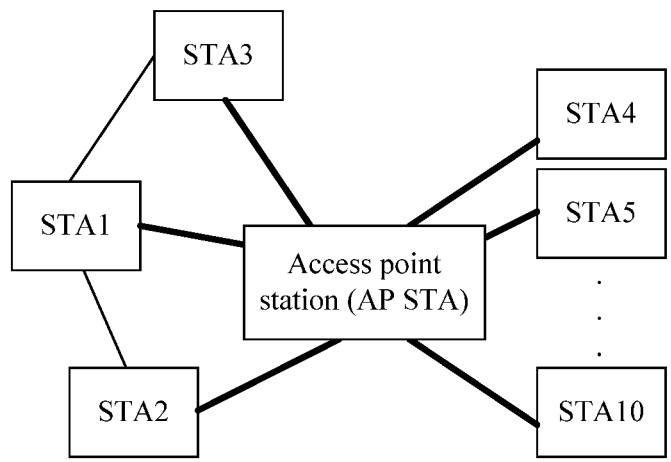
FIG. 3 is a schematic diagram of links established under the same BBS according to an embodiment of the present disclosure.

FIG. 3 is a schematic diagram of links established under a same BBS according to an embodiment of the present disclosure. As illustrated in FIG. 3, a link in an infrastructure network is indicated by a thick solid line, and a direct connection link is indicated by a thin solid line. As illustrated in FIG. 3, the primary node with which STA1 to STA10 are associated is an AP.

In a first embodiment, it is assumed that the AP and multiple stations (STA1 to STA10) form a BSS, and the AP sends a broadcasting frame to notify all the STAs that a network identifier (i.e., a color value) of an infrastructure network is equal to 3. Then a field of the color value in a signaling field of a physical-layer frame header of the radio frame sent from the STA to the AP is set to 3, and the uplink/downlink flag (UL/DL flag) is set to uplink. A field of the color value in a signaling field of a physical-layer frame header of the radio frame sent from AP to the STA is set to 3, and the UL/DL flag is set to downlink.

In the first embodiment, it is assumed that STA1 to STA3 support a direct connection technology, such as TDSL or DSL, and it is assumed that the STA1 is an initiator, that is, the first node establishes a tunnel direct connection link with an STA2 and the STA3 respectively. The establishment process includes the following operations.

The STA1 sends a direct connection link request frame to the STA2 through a transparent forwarding of the AP. When the STA2 agrees to establish the TDLS, the STA2 sends a direct connection link response frame to the STA1 through a transparent forwarding of the AP. Finally, the STA1 sends a direct connection link acknowledgement frame to the STA2 through a transparent forwarding of the AP. In this way, the direct connection link between the STA1 and the STA2 is established. In the same process, a direct connection link is also established between the STA1 and the STA3, which is not described again here. A schematic diagram of the established link is illustrated in FIG. 3. The transparent forwarding of the AP means that, the STA1 and the STA2 (or the STA1 and STA3) send frames required for establishing direct connection link to each other via the AP by using the infrastructure network. The STA1 to the STA3 encapsulate the frames. In the view of the AP, the frames are the same as ordinary data frames. The AP will forward these direct connection management frames as if the ordinary data frames were forwarded. That is, the AP does not know the frames in the process of establishing a direct connection link between the stations, which is transparent.

As illustrated in FIG. 3, in this scenario, there are three types of transmissions: uplink transmission of an infrastructure network from each STA to the AP, downlink transmission of an infrastructure network from the AP to each STA, and direct connection transmission between the STAs with the established direct connection link.

In order to distinguish different transmissions, in this embodiment, a field of the color value in the signaling field of a physical-layer frame header of the radio frame transmitted by the direct connection link is set to a preset special value of 0, that is, 0 represents a direct connection identifier, and the UL/DL flag is set to downlink. Thus, the station can determine a transmission type of a radio frame upon reception of the radio frame and detection of a physical-layer frame header.

For example, the STA1 to the STA3 in FIG. 3 are both the peer stations of the direct connection link and STAs of the links of the infrastructure network established by the AP. When the STA1 to the STA3 receive a radio frame with a color value being 0 and an UL/DL flag being downlink, the STA1 to the STA3 can determine that the radio frame is transmitted on the direct connection link. Therefore, the STA1 to the STA3 may be the receiver and need to continue receiving the radio frame. When the STA1 to the STA3 receive the radio frame with the color value being 3 and the UL/DL flag being downlink, it can be determined that the radio frame is a downlink frame sent by the AP with which the STA1 to the STA3 are associated. Therefore, the STA1 to the STA3 may also be the receiver and need to continue receiving the radio frame. When the STA1 to the STA3 receive a radio frame with a color value being 3 and an UL/DL flag being uplink, it can be determined that the radio frame is sent from other STAs to the AP. Therefore, the STA1 to the STA3 are impossible to be the receiver and may not receive the radio frame.

There is no direct connection link between STA4 to the STA10 in FIG. 3, but the STA4 to the STA10 are STAs under the links of the infrastructure network established by the AP. When the STA4 to the STA10 receive a radio frame with a color value being 0 and an UL/DL flag being downlink, it can be determined that the radio frame is transmitted via the direct connection link. Therefore, the STA4 to the STA10 are impossible to be the receiver and may not receive the radio frame. When the STA4 to the STA10 receive a radio frame with a color value being 3 and an UL/DL flag being downlink, it can be determined that the radio frame is a downlink frame sent by the AP with which the STA4 to the STA10 are associated. Therefore, the STA4 to the STA10 may be the receiver and need to continue receiving the radio frame. When the STA4 to the STA10 receive a radio frame with a color value being 3 and an UL/DL flag being uplink, it can be determined that the radio frame is transmitted to the AP by other STAs. Therefore, the STA4 to the STA10 are impossible to be the receiver and may not receive the radio frame.

For the AP in FIG. 3, it is determined that a radio frame is sent by the STA to the AP only upon reception of a radio frame with a color value being 3 and an UL/DL flag being uplink. At this time, the AP continues receiving the radio frame. In other cases, the AP may choose not to receive the radio frame.

Figure 4:
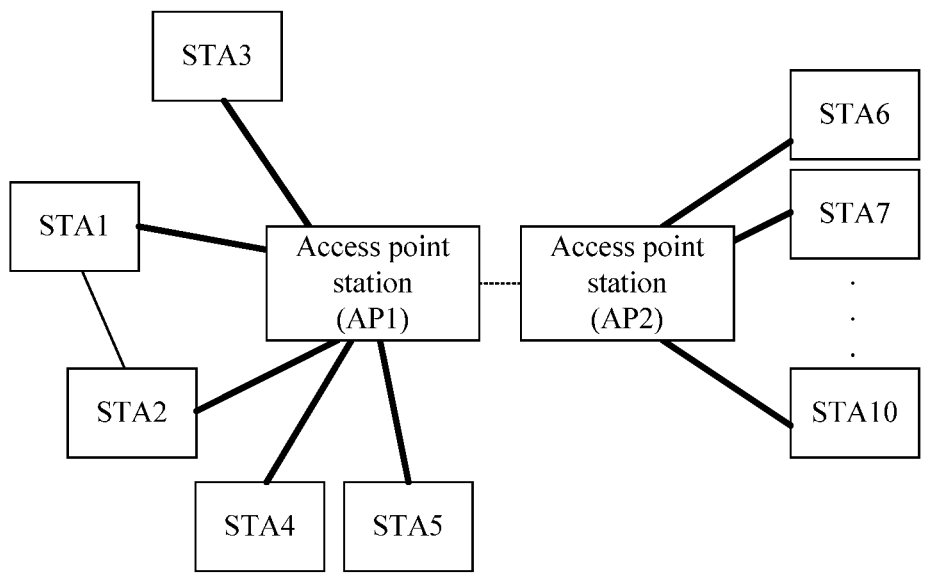
FIG. 4 is a schematic diagram of links established under different BBSs according to an embodiment of the present disclosure.

FIG. 4 is a schematic diagram of establishing links under different BBSs according to an embodiment of the present disclosure. As illustrated in FIG. 4, a link in an infrastructure network is indicated by a thick solid line, a direct connection link between the secondary nodes is indicated by a thin solid line, and a direct connection link between the primary nodes is indicated by a thin dotted line. As illustrated in FIG. 4, the primary node with which STA1 to STA5 are associated is an AP1, and the primary node with which STA6 to STA10 are associated is an AP2.

In a second embodiment, it is assumed that the AP1 and multiple stations, such as STA1 to STA5, form a BSS1, the AP2 and multiple stations, such as STA6 to STA10 form a BSS2. It is assumed that a network identifier (i.e., a color value) of the BSS1 is 3, and a network identifier (i.e., a color value) of the BSS2 is 5.

In the second embodiment, it is assumed that the STA1 and the STA2 support TDLS and are under coverage of the same BSS. It is assumed that a direct connection link is established between STA1 and STA2, and STA1 and STA2 are peer secondary nodes. It is assumed that a direct connection link is also established between AP1 and AP2, but it is a direct connection link between the primary nodes, which may be a link in the form of a mesh, or a direct connection link similar to an AP cluster.

There are two types of direct connection links in this embodiment, one is a direct connection link between primary nodes, and the other is a direct connection link between secondary nodes. In order to distinguish the two types of direct connection links, a field of the color value in the signaling field of a physical-layer frame header of the radio frame transmitted on the direct connection link between the secondary nodes is set to 0 in this embodiment, and an UL/DL flag is uniformly set to downlink. The field of color value in a signaling field of the physical-layer frame header of the radio frame transmitted on the direct connection link between the primary nodes is set to a special value of 0, and an UL/DL flag is uniformly set to uplink. In this way, the radio frames transmitted on different links can be distinguished by the fields of the UL/DL flag. For example, each STA may choose not to receive a radio frame upon reception of a radio frame with a color value being 0 and an UL/DL flag being an uplink. The transmission between different BSSs can be distinguished by a color value. For example, when the STA1 receives the radio frame and detects that the color value is 5, it can be determined that the radio frame is not related to itself, so that it can choose not to continue receiving the radio frame.

In a third embodiment, it is assumed that the AP and multiple stations, such as STA1 to STA10 form a BSS, and it is assumed that the AP sends a broadcasting frame, and notifies all STAs that the network identifier (i.e., the color value) is 3. In the first embodiment, it is assumed that STA1 to STA3 support direct connection technology such as TDSL or DSL. It is assumed that STA1 is an initiator, that is, the first node performs tunnel direct connection link establishment with STA2 and STA3 respectively. In the third embodiment, it is assumed that the color value for the direct connection link is negotiated. The method may include the following operations.

The STA1 sends a direct connection link request frame to the STA2 through a transparent forwarding of the AP, and direct connection link request frame carries one or more color values available to the STA1. If the STA2 agrees to establish a direct connection link, the STA2 sends a direct connection link response frame to STA1 through a transparent forwarding of the AP, and the direct connection link response frame carries one or more color values available to the STA2. Finally, the STA1 sends a direct connection link acknowledgement frame to the STA2 by a transparent forwarding of the AP, and the direct connection link acknowledgment frame carries a determined color value of the direct connection link between the STA1 and the STA2, so that the direct connection link between STA1 and STA2 is established. By using the same process, the color value to use can also be negotiated between the STA1 and the STA3. The value of a direct connection link between the STA1 and the STA3 may be the same as or different from the color value of the direct connection link between the STA1 and the STA2. A schematic diagram of the established links can be seen in FIG. 3.

In addition, after the direct connection link is established, the peer stations can also modify the color value corresponding to the direct connection link according to changes of the network (such as a load) to avoid conflicts with the color values of other direct connection links. The modifying process is similar to the establishment process, based on the above-described establishment process of the embodiments of the present disclosure, which are easily implemented by those skilled in the art, and are not described here.

Further, one of peer secondary nodes (such as the STA1 or the STA2 in this embodiment) may send a notification frame to the AP with which the secondary node is associated after the establishment of the direct connection link. For example, the STA1 sends a notification frame to the AP. Due to the transparency of establishing TDLS, if a direct connection station does not send any frame to the AP, the AP will not know the information related to the direct connection link. The notification frame in this embodiment is used for notifying the AP of a condition of the established direct connection link. The notification frame may include information such as an establishment complete indication of the direct connection link, a direct connection identifier of an established direct connection link, a characteristic of a service transmitted over the direct connection link, or a channel access manner of the direct connection link. Characteristics of a service transmitted over the direct connection link may include information such as a transmission rate of the direct connection link, a service specification, and resources to be occupied by the service. The channel access manner of the direct connection link may indicate the manner in which the STA1 and the STA2 occupy resources, for example, the channel access manner may be a contention-based channel access manner, or a scheduling-based channel access manner (that is a manner of allocating resources by an AP), or a combination of the two manners. The AP knows the condition of the direct connection link by receiving the notification frame.

Further, upon reception of the above-described notification frame, the AP may also reply a notification acknowledgement frame to the secondary node. The notification acknowledgment frame may include one of the following information: a direct connection identifier allocated to the direct connection link, a specified channel access manner of the direct connection link, or specified channel access parameters of the direct connection link. Accordingly, the communication between the stations of the direct connection link is controlled by the primary node, thereby avoiding interference between the transmission of the infrastructure network and the transmission of the direct connection link.

In addition to the methods for determining the direct connection identifier in the first embodiment, the second embodiment, and the third embodiment, a method for determining the direct connection identifier by the secondary node may be further provided in a fourth embodiment. In the fourth embodiment, it is assumed that the AP and multiple stations, such as STA1 to STA10 form a BSS, and it is assumed that the AP transmits a broadcasting frame to notify all STAs that the network identifier (i.e., the color value) of the infrastructure network is 3. It is assumed that STA1 to STA3 support direct connection technology such as TDSL or DSL, and it is assumed that STA1 is an initiator and establishes a tunnel direct connection link with STA2 and STA3 respectively. In this embodiment, the method for determining the identifier corresponding to the direct connection link between STA1 and STA3 may include the following operations.

The AP broadcasts the direct connection identifier, that is, the AP notifies one or more direct connection identifiers that are specially allocated to the direct connection link, such as a network identifier (i.e., a color value). In this case, if all STAs in the BSS establish a direct connection link, the direct connection identifier should be one of the one or more color values broadcasted by the AP. Further, the AP may also update the network identity allocated to the direct connection link according to a network condition.

Alternatively, the AP allocates a direct connection identifier to the currently-established direct connection link, that is, the AP notifies the direct connection identifier (such as a network identifier, i.e., a color value) that is specially allocated to the direct connection link to a pair of stations related to the direct connection link in the BSS. For example, the AP notifies STA1 and STA2 of the specially allocated color value of 0 as a direct connection identifier of the direct connection link established between the STA1 and the STA2. The specific process may be as follows. One of the peer stations related to the direct connection link, such as STA1, sends notification information of the direct connection link to the associated AP, and the AP allocates an identifier to the direct connection link according to the notification information of the direct connection link. The notification information may be carried in the notification frame sent to the AP, and may include any combination of the following information: an establishment complete indication of the direct connection link, characteristics of a service transmitted over the direct connection link, or a channel access manner of the direct connection link.

Alternatively, when station obtains the network identifier (i.e., the color value) of the infrastructure network from the AP, the direct connection identifier is a specified value obtained by performing operation on the network identifier (i.e., the color value) of the infrastructure network. For example, an identifier of a direct connection link established in the BSS is equal to the identifier of the infrastructure. Or, the direct connection identifier is equal to the identifier (i.e., the color value) of the infrastructure network adds a preset specified value. Or, the direct connection identifier is a value obtained by performing operation on the network identifier (i.e., the color value) of the infrastructure network, and the operation may be a common operation such as subtraction, exclusive OR, modulo, or any combination of the operations. It should be noted that, when neither of stations that established a direct connection link obtains the network identifier (i.e., the color value) of the infrastructure network from the AP it associated with, the direct connection identifier may be a preset reserved special value of the color value as the network identifier.

In a fifth embodiment, based on a manner of negotiation without a constant direct connection identifier according to an embodiment of the disclosure, the establishing method in this embodiment may further include the following operations.

Before determining the direct connection identifier, radio frames transmitted on a wireless channel are checked by one of the peer stations, network identifiers (i.e, the color values) of an infrastructure network that have been taken for other surrounding networks or other surrounding BSSs are determined, and the network identifiers (i.e., color values) that have been occupied by other surrounding direct connection links are determined. In this case, a value different from the occupied network identifier may be determined as a network identifier of direct connection link to be established.

After the direct connection link is established, the peer stations may also modify the network identifier (i.e., the color value) for the direct connection link based on changes of the surrounding network environment. Specifically, radio frames of other stations may be detected via the air interface to determine the conflict condition of the network identifier or the direct connection identifier. When the conflict is serious (for example, a radio frame carrying a direct connection identifier being the same as that of the direct link where the peer station is located is received), other direct connection identifiers may be used to avoid the conflict.

In addition, when the peer stations are secondary nodes, in order to improve network efficiency and reduce the interference caused by resources contention on the direct connection link, the AP may take some measures to control activities of stations of the direct connection link.

For example, an AP may limit an STA not to use a color value freely. The AP may send a notification frame to the STA, such as Beacon frame, and it is indicated in the notification frame whether to allow the direct connection stations to select the color value to use freely. When the AP indicates not allowing in the notification frame, the color value selected by the STA during establishing the direct connection link can only be a color value corresponding to an infrastructure network, or a special reserved value such as 0. When the AP indicates allowing to freely select the color value in the notification frame, the STA may use a color value determined in a negotiation process between the STAs.

For example, the AP may also indicate in the Beacon frame that the secondary nodes in the network cannot establish a direct connection link. Alternatively, the AP allows to establish the direct connection link between the secondary nodes in the network, and it is indicated in the Beacon frame that, after the direct connection link is established, one of the peer stations should notify the AP of the establishment condition of the direct connection link such as a characteristic of a service transmitted over the direct connection link. In addition, the AP can further directly notify information on resource utilization limitation of the direct connection link. For example, it may be limited that transmission resources of the direct connection link should be performed on resources indicated by the AP and resource access parameters or a channel access manner indicated by the AP is used, and the like.

In a sixth embodiment, the method for implementing data transmission on a direct connection link according to this embodiment may include that: after a direct connection link between peer stations is established and direct connection control information is determined, the peer station transmits a radio frame via the established direct connection link, and the radio frame carries the direct connection control information. The radio frame may be an HE radio frame.

If the peer station sends a radio frame in a single-user format, as illustrated in FIG. 5, FIG. 5 is a schematic diagram of a format of a HE radio frame in a radio frame in a single-user format according to an embodiment of the present disclosure. The direct connection control information is indicated in a first signaling field of a header of the radio frame (that is, a signaling field A). In some implementations, in order to improve the reliability of the first signaling field (that is the signaling field A), two or more first signaling fields (that is, the signaling field A) may be set, that is, the first signaling field is repeated (that is, the signaling field A).

If the peer station sends a radio frame in a multi user format, as illustrated in FIG. 6, FIG. 6 is a schematic diagram of a format of a HE radio frame in a radio frame in a multi-user format according to an embodiment of the present disclosure. Direct connection control information is indicated in a first signaling field of a header of the radio frame (that is, the signaling field A), and an identifier of one or more target peer stations for receiving the radio frame is indicated in the second signaling field of the header of the radio frame (that is, a signaling field B).

Figures 7, 8:
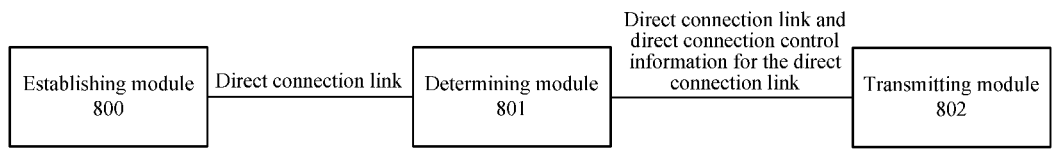
FIG. 7 is a schematic diagram of an HE radio frame format in a trigger format radio frame according to the disclosure.
FIG. 8 is a schematic diagram of a structure of a node according to an embodiment of the disclosure.

At least one of multiple other peer stations that receive a trigger frame may return a radio frame in a trigger format, when one of the peer stations send a trigger frame to multiple other peer stations that establish a direct connection link that to notify it to transmit data to a peer station that initiated the trigger frame. As illustrated in FIG. 7, FIG. 7 is a schematic diagram of a format of a HE radio frame in a radio frame in a trigger format according to an embodiment of the present disclosure, similar to a radio frame in a single-user format, the direct connection control information is indicated in the first signaling field (that is, the signaling field A) in a radio frame header in a trigger format.

The above-described radio frame in an HE format, as illustrated in FIG. 5 to FIG. 7, further includes a conventional training field and a conventional signaling field for backward compatibility with the conventional WLAN device, and it is determined that the radio frame is in a HE frame format by repeating the conventional signaling field.

For example, it is assumed that the AP and multiple stations, such as STA1 to STA10, form a BSS. It is assumed that STA1 and STA2, STA1 and STA3 respectively establish a direct connection link, and the color value of the infrastructure network is 3. In order to distinguish different transmissions, in the embodiment, it is assumed that the color value of the direct connection link is 0.

After the direct connection link is established and the direct connection identifier is determined, for example, it is assumed that STA1 sends a radio frame to STA2 or STA3 respectively, and the radio frame is in a single user format. As illustrated in FIG. 5, a color value in a signaling field of a physical layer header in the radio frame is set to 0, and a color field in the first signaling field (that is a signaling field A) of the physical layer frame header may be set to 0, and an UUDL field (not illustrated in FIG. 5) in the signaling field A is set to downlink. Similarly, the radio frame sent from the STA2 or the STA3 to STA1 is set similarly.

For another example, it is assumed that STA1 sends radio frames to the STA2 and the STA3 in parallel, and the radio frame is in a multi user radio frame format. As illustrated in FIG. 6, a color value in a signaling field of the physical layer header in the radio frame is set to 0, and a color field in the first signaling field (that is a signaling field A) of the physical layer header may be set to 0, and an UL/DL field (not illustrated in FIG. 6) in the signaling field A is set to downlink. The second signaling field (that is a signaling field B) carries the identifiers of the STA2 and the STA3, and transmission parameters and resource locations of data sent to the STA2 and the STA3. The peer stations can also send data of a user by the multiuser radio frame format. For example, the STA2 sends data to the STA1 by the multiuser radio frame format, so that the radio frame can carry the signaling field B, and the signaling field B indicates that the receiver is the STA1, so that stations other than the STA1 may not receive the radio frame.

For example, it is assumed that the STA1 sends trigger frames to the STA2 and the STA3, and notifies the STA2 and the STA3 to send data to the STA1 in parallel. Upon reception of the trigger frames, the STA2 and the STA3 send radio frames to the STA1 in parallel, and the radio frame is in a trigger format. As illustrated in FIG. 7, the color value in a signaling field of the physical layer header in the radio frame is set to 0, and the color value in the first signaling field (that is the signaling field A) of the physical layer header may be set to 0.

FIG. 8 is a schematic diagram of a structure of a node according to an embodiment of the present disclosure. As illustrated in FIG. 8, the node at least includes an establishing module 800 and a determining module 801.

The establishing module 800 is configured to establish a direct connection link with a second node that is a peer station of the node.

The determining module 801 is configured to determine direct connection control information for an established direct connection link according to a preset strategy for determining direct connection control information.

The node according to an embodiment of the disclosure may further include: a transmitting module 802, configured to transmit a radio frame via the established direct connection link, where the radio frame carries the direct connection control information.

The determining module 801 is configured to notify the establishing module 800 when the strategy for determining the direction connection control information is determining by negotiation between the peer stations. The establishing module 800 is configured to negotiate the direct connection control information in a process of establishing a direct connection link between the node and the second node that is a peer station of the node. The establishing module 800 may be configured to:

send a direct connection link request frame to the second node that is a peer station of the node, where the direct connection link request frame carries at least one direct connection control information available to the node;

receive a direct connection link response frame from the second node that is the peer station of the node, where the direct connection link response frame carries at least one direct connection control information available to the second node that is the peer station of the node; and send a direct connection link acknowledgement frame to the second node that is a peer station of the node, where the direct connection link acknowledgement frame indicates a determined direct connection control information for the direct connection link.

In an exemplary implementation, the direct connection link request frame, the direct connection link response frame and the direct connection link acknowledgement frame may be forwarded by a primary node with which the node is associated when the node and the second node that is the peer station of the node are secondary nodes.

In an exemplary implementation, the transmitting module 802 may further be configured to send a notification frame to a primary node with which the node is associated, where the notification frame includes any combination of the following information: an establishment complete indication of the direct connection link, a direct connection identifier of the established direct connection link, a characteristic of a service transmitted over the direct connection link or a channel access manner of the direct connection link.

In an exemplary implementation, the transmitting module 802 is further configured to: receive a notification acknowledgement frame from the primary node with which the node is associated, where the notification acknowledgement frame includes at least one of the following information: a direct connection identifier allocated to the direct connection link, a specified channel access manner of the direct connection link, or specified channel access parameters of the direct connection link.

In an exemplary implementation, the determining module 801 is further configured to: modify the direct connection identifier for an established direct connection link according to a network condition after the direct connection link is established, such as a color value.

When the strategy for determining direct connection control information is: determining preset direct connection control information for the direct connection link to be direct connection control information for the established direct connection link, the determining module 801 may be configured to determine the preset direct connection control information for the direct connection link to be the direct connection control information for the established direct connection link. In this time, the establishing module establishes a direct connection link between the peer stations.

When the node and the second node that is the peer station of the node are secondary nodes and the strategy for determining the direct connection control information is determining direct connection control information provided by a primary node to be the direct connection control information for the established direct connection link, the determining module 801 may be configured to determine direct connection control information from the primary node with which the node is associated to be the direct connection control information for an established direct connection link. The direct connection control information from the primary node with which the node is associated may include: a direct connection identifier broadcasted by the primary node, a direct connection identifier allocated by the primary node, or a direct connection identifier in the direct connection control information determined by the primary node according to a network identifier of an infrastructure network or a device identifier of the primary node, or the like.

In the above-described method for determining direct connection control information for the direct connection link, in addition to a manner of using the preset direct connection control information for the direct connection link, the determining module 801 may further be configured to check radio frames transmitted on a wireless channel; and determine network identifiers of an infrastructure network that have been taken for other networks or other basic service sets (BSSs) around and network identifiers for other direct connection links around.

When the peer stations are secondary nodes, to improve a network efficiency and reduce interference caused by resource contention between the direct connection link, in an exemplary implementation, the determining module 801 may further be configured to receive notification information carrying measures for controlling an activity of a station of the direct connection link from the primary node with which the node is associated. The notification information may include and is not limited to at least one of the following information: an indication of whether to allow peer stations to select a direct connection identifier freely, an indication of whether to require the peer stations to notify the primary node of establishment of the direct connection link, or information of resource usage limits of the direct connection link.

The transmitting module 802 may be configured to execute the following operations.

The direct connection control information is indicated in a first signaling field of a header of the radio frame, when the node where the transmitting module is located sends a radio frame in a single user format. In an exemplary embodiment, to improve the reliability of the first signaling field, two or more first signaling fields may be provided, that is, the first signaling field is repeated.

Alternatively, the direct connection control information is indicated in a first signaling field of a header of the radio frame, and an identifier of at least one target peer station receiving the radio frame is indicated in a second signaling field of the header of the radio frame, when the node where the transmitting module is located sends a radio frame in a multi user format.

Alternatively, the direct connection control information is indicate in a first signaling field of a header of a radio frame in a trigger format, when the node where the transmitting module is located sends a trigger frame to multiple other peer stations establishing the direct connection link to notify the peer stations to send data to the peer station initiating the trigger frame and the radio frame in a trigger format is returned by at least one of the multiple other peer stations receiving the trigger frame.

The radio frame or the radio frame in the trigger format described above is a radio frame in an HE format, and may further include a conventional training field and a conventional signaling field for backward compatibility with the conventional WLAN device, and the conventional signaling field is repeated to determine that the radio frame is in the HE frame format.

A node is further provided according to an embodiment of the disclosure, which at least includes a transmitting module 802 configured to transmit a radio frame via an established direct connection link, where the radio frame carries the direct connection control information.

The node is a secondary node or a primary node.

In an exemplary implementation, the transmitting module 802 may be configured to: indicate, in a first signaling field of a header of the radio frame, the direct connection control information, when the node where the transmitting module is located sends a radio frame in a single user format; or indicate, in a first signaling field of a header of the radio frame, the direct connection control information, and indicate, in a second signaling field of the header of the radio frame, an identifier of at least one target peer station receiving the radio frame, when the node where the transmitting module is located sends a radio frame in a multi user format; or indicate, in a first signaling field of a header of a radio frame in a trigger format, the direct connection control information, when the node where the transmitting module is located sends a trigger frame to multiple other peer stations establishing the direct connection link to notify the peer stations to send data to the peer station initiating the trigger frame and the radio frame in a trigger format is returned by at least one of the multiple other peer stations receiving the trigger frame.

The radio frame or the radio frame in the trigger format described above is a radio frame in an HE format.

The direct connection control information at least includes at least one of: a direct identifier of the direct connection link, or a transmission direction value of the direct connection link. The direct connection identifier is a network identifier for the direct connection link.

When the node is a primary node, the transmission direction value of the direct connection link indicates uplink; or when the node is a secondary node, the transmission direction value of the direct connection link indicates downlink.

In addition, an embodiment of the present disclosure further provides a computer readable storage medium storing computer executable instructions, where the computer executable instructions are executed by a processor to implement the above-described method for establishing a direct connection link.

The embodiment of the disclosure further provides a computer-readable storage medium storing computer executable instructions, which are implemented by the processor to implement the above-described method for implementing data transmission on the direct connection link.

Those skilled in the art may appreciate that, all or some of the steps of the methods disclosed above, functional module/units in the systems and the devices may be implemented as software, firmware, hardware, and a suitable combinations thereof. In a hardware implementation, the division between functional modules/units mentioned in the above description does not necessarily correspond to the division of physical units. For example, a physical component may have multiple functions, or a function or step may be performed by several physical components together. Some or all of the components may be implemented as software executed by a processor, such as a digital signal processor or a microprocessor, or as hardware, or as an integrated circuit, such as an application specific integrated circuit. Such software may be distributed on a computer-readable medium that may include computer storage media (or non-transitory media) and communication media (or transitory media). As is well known to those skilled in the art, the term of the computer storage medium includes volatile and nonvolatile medium, removable and non-removable medium, which are implemented in any method or technology for storing information, such as computer-readable instructions, data structures, program modules or other data. The computer storage media includes, but is not limited to, RAM, ROM, EEPROM, flash memory or other memory technology, CD-ROM, digital versatile disc (DVD) or other optical disc storage, magnetic cassette, magnetic tape, magnetic disk storage or other magnetic storage device, or any other medium used to store the desired information and that can be accessed by a computer. Moreover, it is well known to those skilled in the art that, communication media typically includes computer-readable instructions, data structures, program modules, or other data in a modulated data signal, such as a carrier wave or other transmission mechanism, and may include any information delivery media.

The above is only an illustrative example of the present disclosure and is not intended to limit the scope of protection of the present disclosure. Any modifications, equivalent substitutions, improvements, and the like made within the spirit and principles of the present disclosure should be included within the scope of protection of the present disclosure.

INDUSTRIAL APPLICABILITY

The embodiment of the present disclosure provides a method for establishing a direct connection link and a method and a node for implementing data transmission, thereby optimizing processes of establishment and transmission of the direct connection link, so that the direct connection link is well distinguished from a link of an infrastructure network, and network efficiency is improved.

The invention claimed is:
1. A method for establishing a direct connection link, comprising:
    establishing a direct connection link between a first node and a second node; and determining direct connection control information for the established direct connection link according to a preset strategy for determining direct connection control information;

wherein the direct connection control information comprises a transmission direction value of the direct connection link; wherein when the first node and the second node are primary nodes, the transmission direction value of the direct connection link indicates uplink; or when the first node and the second node are secondary nodes, the transmission direction value of the direct connection link indicates downlink.

2. The method according to claim 1, wherein the strategy for determining the direct connection control information comprises: determining the direct connection control information by negotiation between the first node and the second node, and the establishing method comprises:

sending, by the first node, a direct connection link request frame to the second node, wherein the direct connection link request frame carries at least one direct connection control information available to the first node (200);

receiving, by the first node, a direct connection link response frame from the second node, wherein the direct connection link response frame carries at least one direct connection control information available to the second node (201); and sending, by the first node, a direct connection link acknowledgement frame to the second node, wherein the direct connection link acknowledgement frame carries the determined direct connection control information used for the direct connection link (202).

3. The method according to claim 2, wherein the first node and the second node are secondary nodes, and the establishing method further comprises:

sending, by the first node, a notification frame to a primary node with which the first node is associated, wherein the notification frame comprises at least one of the following information: an establishment complete indication of the direct connection link, a direct connection identifier of the established direct connection link, characteristics of a service transmitted over the direct connection link, or a channel access manner of the direct connection link; and upon reception of the notification frame by the primary node, receiving, by the first node, a notification acknowledgement frame from the primary node, wherein the notification acknowledgement frame comprises at least one of the following information: a direct connection identifier allocated to the direct connection link, a specified channel access manner of the direct connection link, or specified channel access parameters of the direct connection link.

4. The method according to claim 1, wherein the strategy for determining the direct connection control information comprises: determining preset direct connection control information for the direct connection link to be the direct connection control information for the established direct connection link, and the establishing method comprises:

establishing the direct connection link between the first node and the second node, and determining the preset direct connection control information for the direct connection link to be the direct connection control information for the established direct connection link.

5. The method according to claim 1, wherein the first node and the second node are secondary nodes;

the strategy for determining the direct connection control information comprises: determining direct connection control information provided by a primary node with which the first node and the second node are associated to be the direct connection control information for the established direct connection link, and the establishing method comprises:

establishing the direct connection link between the first node and the second node; and determining, by the first node and the second node, one of a plurality of direct connection identifiers broadcasted by the primary node to be a direct connection identifier in the direct connection control information; or, determining, by the first node and the second node, a direct connection identifier allocated by the primary node to be a direct connection identifier in the direct connection control information; or, determining, by the first node and the second node, a direct connection identifier which is notified by the primary node and determined according to a network identifier of an infrastructure network or a device identifier of the primary node to be a direct connection identifier in the direct connection control information; or, determining, by the first node and the second node, a preset reserved value to be a direct connection identifier in the direct connection control information when neither the first node nor the second node receives a notification from the primary node with which the first node and the second node are associated.

6. The method according to claim 1, wherein the direct connection control information further comprises a direct connection identifier of the direct connection link, wherein the direct connection identifier is a network identifier for the direct connection link.

7. The method according to claim 6, further comprising:

before determining the direct connection identifier in the direct connection control information, checking, by the first node or the second node or a primary node, radio frames transmitted on a wireless channel; and determining, by the first node or the second node or the primary node, network identifiers of an infrastructure network that have been taken for other networks or other basic service sets (BSSs) and network identifiers that have been taken for other direct connection links.

8. The method according to claim 6, further comprising:

after the direct connection link is established, modifying, by the first node or the second node, the direct connection identifier for the direct connection link according to a network condition.

9. The method according to claim 1, further comprising:

receiving, by the first node or the second node, notification information carrying measures for controlling activities of stations of the direct connection link from a primary node, wherein the notification information comprises at least one of the following information: an indication of whether to allow peer stations to select a direct connection identifier freely, an indication of whether to require the peer stations to notify the primary node of establishment of the direct connection link, or information of resource usage limits of the direct connection link.

10. The method according to claim 1, wherein the first node and the second node are peer stations, and the method further comprises:
- transmitting, by peer stations, radio frames via an established direct connection link, the radio frames carrying the direct connection control information,
- wherein the peer stations are secondary nodes or primary nodes.

11. The method according to claim 10, wherein carrying the direct connection control information in the radio frames comprises:
- indicating, in a first signaling field of a header of a radio frame, the direct connection control information, when one of the peer stations sends the radio frame in a single user format; or
- indicating, in a first signaling field of a header of a radio frame, the direct connection control information, and indicating, in a second signaling field of the header of the radio frame, an identifier of at least one target peer station receiving the radio frame, when one of the peer stations sends the radio frame in a multi user format; or
- indicating, in a first signaling field of a header of a radio frame in a trigger format, the direct connection control information, when one of the peer stations sends a trigger frame to a plurality of other peer stations establishing direct connection links to notify the peer stations to send data to the peer station initiating the trigger frame and the radio frame in a trigger format is returned by at least one of the plurality of other peer stations receiving the trigger frame,
- wherein the radio frame or the radio frame in the trigger format is a radio frame in a high efficiency (HE) format.

12. A method for implementing data transmission on a direct connection link, comprising:
- transmitting, by peer stations, radio frames via an established direct connection link, wherein the radio frame carries direct connection control information;
- wherein the direct connection control information comprises a transmission direction value of the direct connection link; wherein
- when the peer stations are primary nodes, the transmission direction value of the direct connection link indicates uplink; or
- when the peer stations are secondary nodes, the transmission direction value of the direct connection link indicates downlink.

13. The method according to claim 12, wherein the peer stations are secondary nodes or primary nodes.

14. The method according to claim 12, wherein carrying the direct connection control information in the radio frame comprises:
- indicating, in a first signaling field of a header of a radio frame, the direct connection control information, when one of the peer stations sends the radio frame in a single user format; or
- indicating, in a first signaling field of a header of a radio frame, the direct connection control information, and indicating, in a second signaling field of the header of the radio frame, an identifier of at least one target peer station receiving the radio frame, when one of the peer stations sends the radio frame in a multi user format; or
- indicating, in a first signaling field of a header of a radio frame in a trigger format, the direct connection control information, when one of the peer stations sends a trigger frame to a plurality of other peer stations establishing direct connection links to notify the peer stations to send data to that initiating the trigger frame and the radio frame in a trigger format is returned by at least one of the plurality of other peer stations receiving the trigger frame,
- wherein the radio frame or the radio frame in the trigger format is a radio frame in a high efficiency (HE) format.

15. The method according to claim 12, wherein the direct connection control information further comprises a direct connection identifier of the direct connection link,
- wherein the direct connection identifier is a network identifier for the direct connection link.

16. A node, comprising a processor and a memory storing computer-readable operation instructions, wherein when the computer-readable operation instructions in the memory are run, the processor is configured to:
- establish a direct connection link between the node and a peer node of the node; and
- determine direct connection control information for the established direct connection link according to a preset strategy for determining direct connection control information;
- wherein the direct connection control information comprises a transmission direction value of the direct connection link; wherein
- when the node and the peer node of the node are primary nodes, the transmission direction value of the direct connection link indicates uplink; or when the node and the peer node of the node are secondary nodes, the transmission direction value of the direct connection link indicates downlink.

17. The node according to claim 16, wherein the processor is configured to:
- when the strategy for determining direct connection control information comprises determining the direct connection control information by negotiation between peer stations, negotiate the direct connection control information in a process of establishing the direct connection link between the node and the peer node of the node.

18. The node according to claim 16, wherein, when the strategy for determining direct connection control information comprise determining preset direct connection control information for the direct connection link to be the direct connection control information for the established direct connection link, the processor is configured to:
- determine the preset direct connection control information for the direct connection link to be the direct connection control information for the established direct connection link.

19. The node according to claim 16, wherein, when the node and the peer node of the node are secondary nodes and the strategy for determining direct connection control information comprises determining direct connection control information provided by a primary node to be the direct connection control information for the established direct connection link, the processor is configured to:
- determine direct connection control information from the primary node with which the node is associated to be the direct connection control information for an established direct connection link.

* * * * *